United States Patent Office 3,271,392
Patented Sept. 6, 1966

3,271,392
17α-[3'-FURYL]-ESTROGENS
Yvon Lefebvre, Pierrefonds, Quebec, Canada, assignor to American Home Products Corporation, New York, N.Y., a corporation of Delaware
No Drawing. Filed Sept. 14, 1965, Ser. No. 487,335
31 Claims. (Cl. 260—239.55)

The present invention relates to new compounds represented by Formula I, in which R represents hydrogen or a lower aliphatic acyl group such as, for example, acetate, propionate and butyrate, and R' represents hydrogen, a lower alkyl group containing from 1–4 carbon atoms, a cycloalkyl group containing from 5–6 carbon atoms, the tetrahydropyranyl group, or an acyl group, such as, for example, acetate, propionate, butyrate, benzoate, succinate, hexahydrobenzoate, cyclopentylpropionate or X<sup>+</sup>SO<sub>3</sub><sup>−</sup> in which X represents a cation such as sodium, potassium or an organic base. The dotted lines in ring B indicate that an extra double bond in position 7,8 or two double bonds in positions 6,7 and 8,9 may be present.

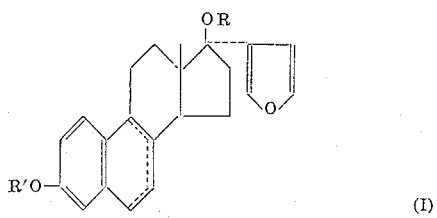

(I)

The new compounds of this invention are powerful estrogens, exceptionally active when administered orally. Some of the compounds of this invention surpass the most potent orally active estrogens by considerable factors. The use of orally active estrogens in the treatment of the menopausal syndrome, as an additive to orally active contraceptives, in the treatment of excessive surface bleeding, of atherosclerosis, and of prostatic tumors has been extensively described in the literature. The compounds of this invention may be formulated in solution in suitable vehicles such as, for example, vegetable oils, for subcutaneous or intramuscular injection. They may also be formulated in the form of tablets or capsules for oral administration with excipients such as, for example, starch, glucose, magnesium trisilicate, or magnesium stearate. They may be administered in daily dosages containing from 4 to 500 micrograms.

The preferred starting materials for the preparation of the novel compounds are represented by Formula II, in which R' represents hydrogen, lower alkyl such as methyl, ethyl,

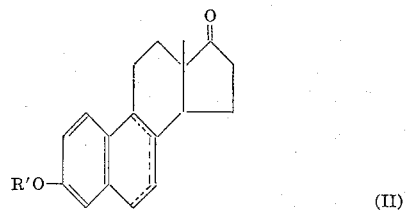

(II)

propyl, isopropyl, butyl, sec.-butyl or cycloalkyl such as cyclopentyl or cyclohexyl. The dotted lines have the same significance as defined above. The 3-alkyl and cycloalkyl ethers of equilin and equilinin are prepared according to the method used to synthesize the known ethers of estrone [F. Glockling and D. Kingston, Chem. and Ind., 1037 (1961)].

The products of this invention are obtained when the starting materials of Formula II are treated with 3-furyllithium in mixtures of ether-benzene, ether-toluene or ether-tetrahydrofuran at temperatures between room temperature and the reflux temperatures of the respective mixture to yield the corresponding 17α-[3'-furyl]-17β-hydroxy steroid I, in which R represents hydrogen and R' represents hydrogen, an alkyl group of from 1–4 carbon atoms, a cycloalkyl group containing from 5–6 carbon atoms, or the tetrahydropyranyl group.

3-furyllithium is prepared according to the procedure of S. Gronowitz and G. Sörlin, Arkiv for Kemi, 19, 515 (1962), by the action of butyllithium upon 3-iodofuran, in ether at −60° C. In turn, 3-iodofuran is obtained from furoic acid according to the method of G. Wright and H. Gilman, J. Am. Chem. Soc., 55, 3302 (1933).

Esterification of the free phenolic hydroxyl in position 3 is achieved by conventional means with acid anhydrides and acid chlorides in pyridine at room temperature to yield the corresponding 3-acyl derivatives. In order to achieve esterification of the tertiary hydroxyl group in position 17 more drastic conditions are required, such as the use of mixtures of acid anhydrides and acid chlorides in pyridine at temperature between room temperature and 100° C. for extended periods of time as for example 1 to 5 days; the corresponding 17-acyl derivatives are thus obtained. If a free phenolic hydroxyl group should also be present in the molecule it will also be esterified under those conditions.

For the preparation of the sulfate esters, the respective steroidal diols are treated with chlorosulfonic acid in the presence of a suitable organic base such as, for example, pyridine or dimethylaniline in an inert solvent. The base salt of the resulting sulfate ester may be purified by conversion to a suitable insoluble salt, such as, for example, to the quinidine salt, which may be purified by washing or by crystallization; or to the ammonium salt which may be purified by extraction with a suitable solvent such as, for example, n-butanol. The resulting quinidine or ammonium salt may be converted to other base salts such as, for example, the sodium or potassium salts, by treatment with the appropriate free base.

The following examples will illustrate my invention.

*Example 1*

The higher ether homologues of equilin and equilenin are prepared by the method of Glockling and Kingston described in Chem. and Ind., 1037 (1961) by the action of the corresponding alkyl halides on the sodium or potassium salts of the phenols. Accordingly, equilin-3-ethyl ether, equilin-3-propyl ether, equilin-3-isopropyl ether, equilin-3-n-butyl ether, equilin-3-sec.-butyl ether, equilin-3-cyclopentyl ether, equilin-3-cyclohexyl ether, equilenin-3-ethyl ether, equilenin-3-propyl ether, equilenin-3-isopropyl ether, equilenin-3-n-butyl ether, equilenin-3-sec.-butyl ether, equilenin-3-cyclopentyl ether, and equilenin-3-cyclohexyl ether are obtained. The corresponding tetrahydropyranyl ethers are prepared according to the method described by A. D. Cross et al. in Steroids, vol. 4, p. 423 (1964).

*Example 2*

To a solution of 21.6 g. of iodofuran in 460 ml. of dry ether at −60° C. are added 58.2 ml. of an ethereal solution of n-butyllithium (1.69 n.). The solution is stirred for 30 minutes at −60° C. A solution of 17.2 g. of estrone methyl ether in 715 ml. of dry toluene is added, the reaction mixture allowed to warm to room temperature and stirred for 65 hours at room temperature.

Ether is added, and the organic solvents are washed with water, dried, and evaporated. Crystallization of the residue from methylene chloride-ether yields pure 17α-[3' - furyl] - 17β - hydroxy - 3 - methoxy - 1,3,5(10) estratriene, M.P. 160–162° C.

Example 3

In the same manner as described in Example 2, estrone-3-ethyl ether, estrone-3-propyl ether, estrone-3-isopropyl ether, estrone-3-n-butyl ether, estrone-3-sec.-butyl ether, estrone-3-cyclopentyl ether, estrone-3-cyclohexyl ether, and estrone-3-tetrahydropyranyl ether yield 3-ethoxy-17α-[3'-furyl]-17β-hydroxy-1,3,5(10)-estratriene, 17α-[3'-furyl]-17β-hydroxy-3-propoxy-1,3,5(10)-estratriene, 17α-[3'-furyl]-17β-hydroxy-3-isopropoxy-1,3,5(10)-estratriene, 3-n-butoxy-17α-[3'-furyl]-17β-hydroxy-1,3,5(10)-estratriene, 3-sec.-butoxy-17α-[3'-furyl]-17β-hydroxy-1,3,5(10)-estratriene, 3-cyclopentyloxy-17α-[3'-furyl]-17β-hydroxy-1,3,5(10)-estratriene, 3-cyclohexyloxy-17α-[3'-furyl]-17β-hydroxy-1,3,5(10)-estratriene, and 17α[3'-furyl]17β-hydroxy-3-tetrahydropyranyloxy-1,3,5(10)-estratriene, when treated with 3-furyllithium.

Example 4

To a solution of 10 g. of iodofuran in 210 ml. of dry ether at −60° C. are added 33.4 ml. of an ethereal solution of n-butyllithium (1.06 n.). After stirring for 30 minutes at −60° C., 10 g. of equilin methyl ether in 330 ml. of dry toluene are added and the reaction is allowed to proceed at room temperature for 24 hours. The reaction product is isolated as indicated in Example 2. Chromatography of the crude product and crystallization from ether-hexene yields pure 17α-[3'-furyl]-17β-hydroxy-3-methoxy-1,3,5(10),7-estratetraene M.P. 124–126° C.

Example 5

17α-[3'-furyl]-17α-hydroxy-3-methoxy-1,3,5,6,8(9)-estrapentaene is obtained when equilenin-3-methyl ether is treated with 3-furyllithium according to the method described above in Examples 2 and 4.

Example 6

Similarly are obtained 3-ethoxy-17α-[3'-furyl]-17β-hydroxy-1,3,5(10),7-estratetraene, 17α-[3'-furyl]-17β-hydroxy-3-propoxy-1,3,5(10),7-estratetraene, 17α-[3'-furyl]-17β-hydroxy-3-isopropoxy-1,3,5(10),7-estratetraene, 3-n-butoxy-17α-[3'-furyl]-17β-hydroxy-1,3,5(10),7-estratetraene, 3-sec.-butyl-17α-[3'-furyl]-17β-hydroxy-1,3,5(10),7-estratetraene, 3-cyclopentyloxy-17α-[3'-furyl]-17β-hydroxy-1,3,5(10),7-estratetraene, 3-cyclohexyloxy-17α-[3'-furyl]-17β-hydroxy-1,3,5(10),7-estratetraene, and 17α-[3'-furyl]-17β-hydroxy-3-tetrahydropyranyloxy-1,3,5(10),7-estratetraene when the corresponding 3-ethers of equilin are treated with 3-furyllithium.

Example 7

In the same manner are obtained 3-ethoxy-17α-[3'-furyl]-17β-hydroxy-1,3,5,6,8(9)-estrapentaene, 17α-[3'-furyl]-17β-hydroxy-3-propoxy-1,3,5,6,8(9)-estrapentaene, 17α-[3'-furyl]-17β-hydroxy-3-isopropoxy-1,3,5,6,8(9)-estrapentaene, 3-n-butoxy-17α-[3'-furyl]-17β-hydroxy-1,3,5,6,8(9)-estrapentaene, 3-sec.-butoxy-17α-[3'-furyl]-17β-hydroxy-1,3,5,6,8(9)-estrapentaene, 3-cyclopentyloxy-17α-[3'-furyl]-17β-hydroxy-1,3,5,6,8(9)-estrapentaene, 3-cyclohexyloxy-17α-[3'-furyl]-17β-hydroxy-1,3,5,6,8(9)-estrapentaene, and 17α-[3'-furyl]-17β-hydroxy-3-tetrahydropyranyloxy-1,3,5,6,8(9)-estrapentaene when the corresponding 3-ethers of equilenin are treated with 3-furyllithium.

Example 8

A mixture of 2.23 g. of iodofuran in 50 ml. of dry ether and 5.7 ml. of an ethereal solution of n-butyllithium (1.91 n.) is left at −60° C. for 30 minutes. Then a solution of 1 g. of estrone in 100 ml. of tetrahydrofuran is added. The mixture is refluxed overnight. After the usual work up 17α-[3'-furyl]-estradiol is obtained.

Example 9

Similarly 3,17β-dihydroxy-17α-[3'-furyl]-1,3,5(10),7-estratetraene and 3,17β-dihydroxy-17α-[3'-furyl]-1,3,5,6,8(9)-estrapentaene are obtained when equilin or equilenin are treated with 3-furyllithium according to the method of Example 8.

Example 10

Acetylation of 1.4 g. of 17α-[3'-furyl]-estradiol in a conventional manner with 14 ml. of pyridine and 1.4 ml. of acetic anhydride at room temperature overnight yields, after dilution with ice-water, extraction with ether, washing and drying up, 3-acetoxy-17α-[3'-furyl]-17β-hydroxy-1,3,5(10)-estratriene.

Similarly 3-acetoxy-17α-[3'-furyl]-17β-hydroxy-1,3,5(10),7-estratetraene and 3-acetoxy-17α-[3'-furyl]-17β-hydroxy-1,3,5,6,8(9)-estrapentaene are obtained, by acetylation of the corresponding derivatives of equilin and of equilenin.

Example 11

Esterification as described in Example 10 of 17α-[3'-furyl]-estradiol by appropriate acid anhydrides or acid halides in pyridine solution gives the corresponding esters such as the 3-propionate, 3-butyrate, 3-benzoate and 3-succinate.

Similarly, esterification of 3,17β-dihydroxy-17α-[3'-furyl]-1,3,5(10),7-estratetraene yields the corresponding 3-esters 3-propionate, 3-butyrate, 3 benzoate, and 3-succinate.

In a similar manner 3,17β-dihydroxy-17α-[3'-furyl]-1,3,5,6,8(9)-estrapentaene yields upon esterification as above the corresponding 3-esters such as 3-propionate, 3-butyrate, 3-benzoate, and 3-succinate.

Example 12

A mixture of 5 g. of 17α-[3'-furyl]-17β-hydroxy-3-methoxy 1,3,5(10)-estratriene in 50 ml. of pyridine and 50 ml. acetic anhydride is heated on a steam bath for 24 hours, diluted with ice water, extracted with ether, washed, dried, and the reaction product is isolated by evaporation of the solvent. Chromatography of the crude product and crystallization from acetone-hexane yields 17β-acetoxy-17α-[3'-furyl]-3-methoxy-1,3,5(10)-estratriene M.P. 154–155° C.

Example 13

Acetylation by the method described in Example 12 of 17α-[3'-furyl]-estradiol yields 3,17β-diacetoxy-17α-[3'-furyl]-1,3,5(10)-estratriene.

Similarly, acetylation of the 3-ethers of 17α-[3'-furyl]-estradiol described in Example 3 yields the corresponding 17β-acetoxy derivatives such as 17β-acetoxy-3-ethoxy-17α-[3'-furyl]-1,3,5(10)-estratriene,
17β-acetoxy 17α-[3'-furyl]-3-propoxy-1,3,5(10)-estratriene,
17β-acetoxy,17α-[3'-furyl]-3-isopropoxy-1,3,5(10)-estratriene,
17β-acetoxy-3-n-butoxy-17α-[3'-furyl]-1,3,5(10)-estratriene,
17β-acetoxy-3-sec.-butoxy-17α-[3'-furyl]-1,3,5(10)-estratriene,
17β-acetoxy-3-cyclopentyloxy-17α-[3'-furyl]-1,3,5(10)-estratriene,
17β-acetoxy-3-cyclohexyloxy-17α-[3'-furyl]-1,3,5(10)-estratriene, and
17β-acetoxy-17α-[3'-furyl]-3-tetrahydropyranyloxy-1,3,5(10)-estratriene.

Similarly, acetylation of the 3-acyl esters of 17α-[3'-furyl-estradiol described in Example 11 yields the corresponding 17β-acetoxy-3-acylated derivatives such as 17β-acetoxy-17α-[3'-furyl]-3-propionyloxy-1,3,5(10)-
   estratriene,
17β-acetoxy-3-butanoyloxy-17α-[3'-furyl]-1,3,5(10)-
   estratriene,
17β-acetoxy-3-benzoyloxy-17α-[3'-furyl]-1,3,5(10)-
   estratriene, and
17β-acetoxy-17α-[3'-furyl]-3-succinoyloxy-1,3,5(10)-
   estratriene.

*Example 14*

Esterification of 17α-[3'-furyl]-estradiol with other acid anhydrides or acid halides, according to the method of Example 12 gives the corresponding 3,17β-diacylated derivatives, such as the 3,17β-dipropionyloxy-17α-[3'-furyl]-1,3,5(10)-estratriene and the 3,17β-dibutanoyloxy-17α-[3'-furyl]-1,3,5(10)-estratriene.

Similarly, esterification of the 3-ethers of 17α-[3'-furyl]-estradiol described in Examples 2 and 3 with other acid anhydrides or acyl halides gives the corresponding 3-ethers of the corresponding 17β-acyloxy derivatives such as, for example, 17α-[3'-furyl]-3-methoxy-17β-propionyloxy-1,3,5(10)-
   estratriene,
17β-butanoyloxy-17α-[3'-furyl]-3-methoxy-1,3,5(10)-
   estratriene,
3-ethoxy-17α-[3'-furyl]-17β-propionyloxy-1,3,5(10)-
   estratriene,
17β-butanoyloxy-3-ethoxy-17α-[3'-furyl]-1,3,5(10)-
   estratriene,
17α-[3'-furyl]-17β-propionyloxy-3-propoxy-1,3,5(10)-
   estratriene,
17β-butanoyloxy-17α-[3'-furyl]-3-propoxy-1,3,5(10)-
   estratriene,
17α-[3'-furyl]-3-isopropoxy 17β-propionyloxy-1,3,5(10)-
   estratriene,
17β-butanoyloxy-17α-[3'-furyl]-3-isopropoxy-1,3,5(10)-
   estratriene,
3-n-butoxy-17α-[3'-furyl]-17β-propionyloxy-1,3,5(10)-
   estratriene,
17β-butanoyloxy-3-n-butoxy-17α-[3'-furyl]-1,3,5(10)-
   estratriene,
3 - cyclopentyloxy - 17α-[3'-furyl]-17β-propionyloxy-1,3,
   5(10)-estratriene,
17β-butanoyloxy-3-cyclopentyloxy-17α-[3'-furyl]-1,3,
   5(10)-estratriene,
3-cyclohexyloxy-17α-[3'-furyl]-17β-propionyloxy-
   1,3,5(10)-estratriene,
17β-butanoyloxy-3-cyclohexyloxy-17α-[3'-furyl]-
   1,3,5(10)-estratriene,
17α-[3'-furyl]-17β-propionyloxy-3-tetrahydropyranyloxy-
   1,3,5(10)-estratriene, and
17β-butanoyloxy-17α-[3'-furyl]-3-tetrahydropyranyl-
   oxy-1,3,5(10)-estratriene.

In a similar manner esterification of the 3-acylated 17α-[3'-furyl]-estradiols yields the mixed diesters such as:

3-butanoyloxy-17α-[3'-furyl]-17β-propionyloxy-
   1,3,5(10)-estratriene,
3-benzoyloxy-17α-[3'-furyl]-17β-propionyloxy-
   1,3,5(10)-estratriene,
17β-butanoyloxy-17α-[3'-furyl]-3-propionyloxy-
   1,3,5(10)-estratriene, and
3-benzoyloxy-17β-butanoyloxy-17α-[3'-furyl]-
   1,3,5(10)-estratriene.

*Example 15*

A mixture of 2.27 g. of 17α-[3'-furyl]-17β-hydroxy-3-methoxy-1,3,5(10),7-estratetraene in 24 ml. acetic anhydride and 24 ml. pyridine is heated on the steam bath for 24 hours. The reaction mixture is diluted with ice-water, extracted with ether, washed, dried, and the product is isolated by evaporation of the solvent. Chromatography and crystallization from methylene chloride-hexane yields 17β-acetoxy-17α-[3'-furyl]-3-methoxy-1,3, 5(10),7-estratetraene M.P. 188–189° C.

Similarly, acetylation of 17α-[3'-furyl]-17α-hydroxy-3-methoxy-1,3,5,6,8(9)-estrapentaene gives 17β-acetoxy-17α-[3'-furyl]-3-methoxy-1,3,5,6,8(9)-estrapentaene.

Similarly, acetylation of the 3-ethers of 3,17β-dihydroxy-17α-[3'-furyl] - 1,3,5(10),7 - estratetraene, and of 3,17β-dihydroxy-17α-[3'-furyl]-1,3,5,6,8(9)-estrapentaene yields the corresponding, 17-acetylated derivatives such as 17β-acetoxy-3-ethoxy-17α-[3'-furyl]-1,3,5(10),7-estra-
   tetraene,
17β-acetoxy-17α-[3'-furyl]-3-propoxy-1,3,5(10),7-estra-
   tetraene,
17β-acetoxy-17α-[3'-furyl]-3-isopropoxy-1,3,5(10),7-
   estratetraene,
17β-acetoxy-3-n-butoxy-17α-[3'-furyl]-1,3,5(10),7-estra-
   tetraene,
17β-acetoxy-3-sec.-butoxy-17α-[3'-furyl]-1,3,5(10),7-
   estratetraene,
17β-acetoxy-3-cyclopentyloxy-17α-[3'-furyl]-1,3,5(10),
   7-estratetraene,
17β-acetoxy-3-cyclohexyloxy-17α-[3'-furyl]-1,3,5(10),7-
   estratetraene,
17β-acetoxy-17α-[3'-furyl]-3-tetrahydropyranyloxy-1,3,
   5(10),7-estratetraene,
17β-acetoxy-3-ethoxy-17α-[3'-furyl]-1,3,5,6,8(9)-estra-
   pentaene,
17β-acetoxy-17α-[3'-furyl]-3-propoxy-1,3,5,6,8(9)-estra-
   pentaene,
17β-acetoxy-17α-[3'-furyl]-3-isopropoxy-1,3,5,6,8(9)-
   estrapentaene,
17β-acetoxy-3-n-butoxy-17α-[3'-furyl]-1,3,5,6,8(9)-estra-
   pentaene,
17β-acetoxy-3-sec.-butoxy-17α-[3'-furyl]-1,3,5,6,8(9)-
   estrapentaene,
17β-acetoxy-3-cyclohexyloxy-17α-[3'-furyl]-1,3,5,6,8(9)-
   estrapentaene,
17β-acetoxy-3-cyclopentyloxy-17α-[3'-furyl]-1,3,5,6,8
   (9)-estrapentaene, and
17β-acetoxy-17α-[3'-furyl]-3-tetrahydropyranyloxy-1,3,
   5,6,8(9)-estrapentaene.

In a similar manner acylation with other acid anhydrides and acid halides yields the corresponding 17-acylated derivatives, such as 3-ethoxy-17α-[3'-furyl]-17β-propionyloxy-1,3,5(10),7-
   estratetraene,
17β-butanoyloxy-3-ethoxy-17α-[3'-furyl]-1,3,5(10),7-
   estratetraene,
17α-[3'-furyl]-17β-propionyloxy-3-propoxy-1,3,5(10),7-
   estratetraene,
17β-butanoyloxy-17α-[3'-furyl]-3-propoxy-1,3,5(10),7-
   estratetraene,
17α-[3'-furyl]-3-isopropoxy-17β-propionyloxy-1,3,5(10),
   7-estratetraene,
17β-butanoyloxy-17α-[3'-furyl]-3-isopropoxy-1,3,5(10),
   7-estratetraene,
3-n-butoxy-17α-[3'-furyl]-17β-propionyloxy-1,3,5(10),
   7-estratetraene,
17β-butanoyloxy-3-n-butoxy-17α-[3'-furyl]-1,3,5(10),7-
   estratetraene,
3-sec.-butoxy-17α-[3'-furyl]-17β-propionyloxy-1,3,5(10),
   7-estratetraene,
17β-butanoyloxy-3-sec.-butoxy-17α-[3'-furyl]-1,3,5(10),
   7-estratetraene,
3-cyclopentyloxy-17α-[3'-furyl]-17β-propionyloxy-1,3,5
   (10),7-estratetraene,
17β-butanoyloxy-3-cyclopentyloxy-17α-[3'-furyl]-1,3,5
   (10),7-estratetraene,
3-cyclohexyloxy-17α-[3'-furyl]-17β-propionyloxy-1,3,5
   (10),7-estratetraene,
17β-butanoyloxy-3-cyclohexyloxy-17α-[3'-furyl]-1,3,5
   (10),7-estratetraene,
17β-butanoyloxy-17α-[3'-furyl]-3-tetrahydropyranyloxy-
   1,3,5(10),7-estratetraene, 17α-[3'-furyl]-17β-propionyloxy-3-tetrahydropyranyloxy-1,3,5(10),7-estratetraene,
3-ethoxy-17α-[3'-furyl]-17β-propionyloxy-1,3,5,6,8(9)-estrapentaene,
17β-butanoyloxy-3-ethoxy-17α[3'-furyl]-1,3,5,6,8(9)-estrapentaene,
17α-[3'-furyl]-17β-propionyloxy-3-propoxy-1,3,5,6,8(9)-estrapentaene,
17β-butanoyloxy-17α-[3'-furyl]-3-propoxy-1,3,5,6,8(9)-estrapentaene,
17α-[3'-furyl]-3-isopropoxy-17β-propionyloxy-1,3,5,6,8(9)-estrapentaene,
17β-butanoyloxy-17α-[3'-furyl]-3-isopropoxy-1,3,5,6,8(9)-estrapentaene,
3-n-butoxy-17α-[3'-furyl]-17β-propionyloxy-1,3,5,6,8(9)-estrapentaene,
17β-butanoyloxy-3-n-butoxy-17α-[3'-furyl]-1,3,5,6,8(9)-estrapentaene,
3-sec.-butoxy-17α-[3'-furyl]-17β-propionyloxy-1,3,5,6,8(9)-estrapentaene,
17β-butanoyloxy-3-n-butoxy-17α-[3'-furyl]-1,3,5,6,8(9)-estrapentaene,
3-sec.-butoxy-17α-[3'-furyl]-17β-propionyloxy-1,3,5,6,8(9)-estrapentaene,
17β-butanoyloxy-3-sec.-butoxy-17α-[3'-furyl]-1,3,5,6,8(9)-estrapentaene,
3-cyclopentyloxy-17α-[3'-furyl]-17β-propionyloxy-1,3,5,6,8(9)-estrapentaene,
17β-butanoyloxy-3-cyclopentyloxy-17α-[3'-furyl]-1,3,5,6,8(9)-estrapentaene,
3-cyclohexyloxy-17α-[3'-furyl]-17β-propionyloxy-1,3,5,6,8(9)-estrapentaene,
17β-butanoyloxy-3-cyclohexyloxy-17α-[3'-furyl]-1,3,5,6,8(9)-estrapentaene,
17β-butanoyloxy-17α-[3'-furyl]-3-tetrahydropyranyl-1,3,5,6,8(9)-estrapentaene,
17α-[3'-furyl]-17β-propionyloxy-3-tetrahydropyranyloxy-1,3,5,6,8(9)-estrapentaene.

In a similar manner esterification under the same conditions of 3,17β - dihydroxy - 17α - [3'-furyl]-1,3,5(10),7-estratetraene and 3,17β-dihydroxy-17α-[3'-furyl]-1,3,5,6,8(9)-estrapentanene with other acylating agents yields the 3,17β-diacylated derivatives such as 3,17β-dipropionyloxy-17α-[3'-furyl]-1,3,5(10),7-estratetraene,
3,17β-dibutanoyloxy-17α-[3'-furyl]-1,3,5(10),7-estratetraene,
3,17β-dipropionyloxy-17α-[3'-furyl]-1,3,5,6,8(9)-estrapentaene and
3,17β-dibutanoyloxy-17α-[3'-furyl]-1,3,5,6,8(9)-estrapentaene.

Similarly, esterification under the same conditions of the 3-acylated 3,17β-dihydroxy-17α-[3'-furyl]-1,3,5(10),7-estratetraenes and the 3,17β-dihydroxy-17α-[3'-furyl]-1,3,5,6,8(9)-estrapentanenes yields the corresponding mixed esters such as for example 3-acetoxy-17α-[3'-furyl]-17β-propionyloxy-1,3,5(10),7-estratetraene,
3-acetoxy-17β-butanoyloxy-17α-[3'-furyl]-1,3,5(10),7-estratetraene,
17β-butanoyloxy-17α-[3'-furyl]-3-propionyloxy-1,3,5(10),7-estratetraene,
3-benzoyloxy-17α-[3'-furyl]-17β-propionyloxy-1,3,5(10),7-estratetraene,
3-benzoyloxy-17β-butanoyloxy-17α-[3'-furyl]-1,3,5(10),7-estratetraene,
17α-[3'-furyl]-17β-propionyloxy-3-succinoyloxy-1,3,5(10),7-estratetraene,
17β-butanoyloxy-17α-[3'-furyl]-3-succinoyloxy-1,3,5(10),7-estratetraene,
3-acetoxy-17α-[3'-furyl]-17β-propionyloxy-1,3,5,6,8(9)-estrapentaene,
3-acetoxy-17β-butanoyloxy-17α-[3'-furyl]-1,3,5,6,8(9)-estrapentaene,
17β-butanoyloxy-17α-[3'-furyl]-3-propionyloxy-1,3,5,6,8(9)-estrapentaene,
3-benzoyloxy-17α-[3'-furyl]-17β-propionyloxy-1,3,5,6,8(9)-estrapentaene,
3-benzoyloxy-17β-butanoyloxy-17α-[3'-furyl]-1,3,5,6,8(9)-estrapentaene,
17α-[3'-furyl]-17β-propionyloxy-3-succinoyloxy-1,3,5,6,8(9)-estrapentaene,
17β-butanoyloxy-17α-[3'-furyl]-3-succinoyloxy-1,3,5,6,8(9)-estrapentaene.

*Example 16*

Redistilled chlorosulfonic acid (0.146 ml.) is added to methylene chloride (4.7 ml.) cooled to −20° C. at such a rate as to keep the temperature below +10° C. Pyridine (0.870 ml.) is added followed by 17α-[3'-furyl]-estradiol (720 mg.). The mixture is refluxed for 2 hours, then poured into an aqueous solution of sodium hydroxide (243 mg. of NaOH in 63 ml. of water). The aqueous solution is washed several times with ether. The pH is then adjusted to 6.5 with acetic acid. An aqueous solution of quinidine sulfate (918 mg. in 85 ml. of water) is added, the steroidal quinidine sulfate is filtered, well washed with water, and dried. This quinidine salt is dissolved in methanol (6.5 ml.), a methanolic solution of sodium hydroxide is added (46 mg. in 2.3 ml. of methanol), and the precipitated quinidine is filtered and washed with methanol. From the filtrate the 17α-[3'-furyl]-estradiol-3-sodium sulfate crystallizes by the addition of ether M.P. 112–114° C. Analysis confirms the empirical formula $C_{22}H_{25}SO_6Na$.

Similarly, the corresponding sodium sulfates of 3,17β-dihydroxy-17α-[3'-furyl]-1,3,5(10),7-estratetraene and of 3,17β - dihydroxy-17α-[3'-furyl]-1,3,5,6,8(9)-estrapentaene are obtained from the corresponding diols.

I claim:
1. A compound of the formula

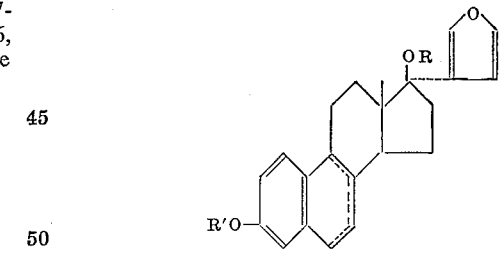

wherein R is selected from hydrogen and lower aliphatic acyl groups; and R' is selected from hydrogen, lower alkyl groups containing from 1 to 4 carbon atoms, cycloalkyl groups containing from 5 to 6 carbon atoms, tetrahydropyranyl and acyl groups, and the group $X^+SO_3^-$ in which X represents a cation selected from the group consisting of sodium, potassium, and organic bases.

2. A compound of the formula

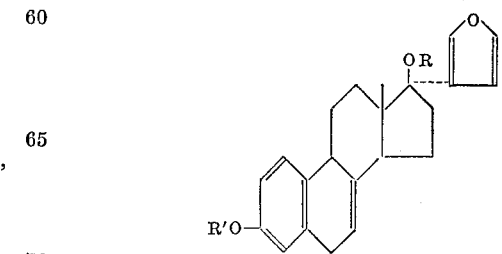

wherein R is selected from hydrogen and lower aliphatic acyl groups; and R' is selected from hydrogen, lower alkyl groups contining from 1 to 4 carbon atoms, cycloalkyl groups containing from 5 to 6 carbon atoms, tetrahydropyranyl and acyl groups, and the group $X^+SO_3^-$ in which X represents a cation selected from the group consisting of sodium, potassium and organic bases.

3. A compound of the formula

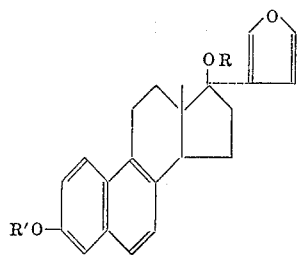

wherein R is selected from hydrogen and lower aliphatic acyl groups; and R' is selected from hydrogen, lower alkyl groups containing from 1 to 4 carbon atoms, cycloalkyl groups containing from 5 to 6 carbon atoms, tetrahydropyranyl and acyl groups, and the group $X^+SO_3^-$ in which X represents a cation selected from the group consisting of sodium, potassium and organic bases.

4. 17α-[3'-furyl]-17β-hydroxy-3 - methoxy - 1,3,5(10)-estratriene.

5. 3-cyclopentyloxy-17α-[3' - furyl] - 17β - hydroxy-1,3,5(10)-estratriene.

6. 17α-[3'-furyl]-17β - hydroxy - 3 - tetrahydropyranyloxy-1,3,5(10)-estratriene.

7. 17α-[3'-furyl]-17β-hydroxy-3 - methoxy-1,3,5(10),7-estratetraene.

8. 17α-[3'-furyl]-17β-hydroxy - 3 - methoxy-1,3,5,6,8 (9)-estrapentaene.

9. 3-cyclopentyloxy-17α-[3' - furyl] - 17β - hydroxy-1,3,5(10),7-estratetraene.

10. 17α-[3'-furyl]-17β-hydroxy - 3 - tetrahydropyranyloxy-1,3,5(10),7-estratetraene.

11. 3-cyclopentyloxy-17α-[3'-furyl] - 17β - hydroxy-1,3,5,6,8(9)-estrapentaene.

12. 17α-[3'-furyl]-17β-hydroxy - 3 - tetrahydropyranyloxy-1,3,5,6,8(9)-estrapentaene.

13. 17α-[3'-furyl]-estradiol.

14. 3,17β-dihydroxy-17α - [3' - furyl] - 1,3,5(10),7-estratetraene.

15. 3,17β-dihydroxy-17α - [3' - furyl] - 1,3,5,6,8(9)-estrapentaene.

16. 3-acetoxy-17α-[3'-furyl] - 17β - hydroxy - 1,3,5 (10)estratriene.

17. 3-acetoxy-17α-[3'-furyl] - 17β - hydroxy - 1,3,5 (10),7-estratetraene.

18. 3-acetoxy-17α-[3'-furyl)-17β - hydroxy - 1,3,5,6,8 (9)-estrapentaene.

19. 17β-acetoxy-17α-[3'-furyl] - 3 - methoxy - 1,3,5 (10)-estratriene.

20. 3,17β-diacetoxy - 17α - [3' - furyl] - 1,3,5(10)-estratriene.

21. 17β-acetoxy-3-cyclopentyloxy - 17α - [3' - furyl]-1,3,5(10)-estratriene.

22. 17β-acetoxy-17α-[3'-furyl] - 3 - tetrahydropyranyloxy-1,3,5(10)-estratriene.

23. 17β-acetoxy-17α-[3'-furyl] - 3 - methoxy - 1,3,5 (10),7-estratetraene.

24. 17β-acetoxy-17α-[3'-furyl]-3 - methoxy - 1,3,5,6,8 (9)-estrapentaene.

25. 17β-acetoxy-3-cyclopentyloxy-17α - [3' - furyl]-1,3,5(10),7-estratetraene.

26. 17β-acetoxy-17α-[3'-furyl] - 3 - tetrahydropyranyloxy-1,3,5(10),7-estratetraene.

27. 17β-acetoxy-3-cyclopentyloxy-17α - [3' - furyl]-1,3,5,6,8(9)-estrapentaene.

28. 17β-acetoxy-17α-[3' - furyl] - 3 - tetrahydropyranyloxy-1,3,5,6,8(9)-estrapentaene.

29. 17α-[3'-furyl]-estradiol-3-sodium sulfate.

30. 3,17β-dihydroxy - 17α-[3' - furyl] - 1,3,5(10),7-estratetraene-3-sodium sulfate.

31. 3,17β-dihydroxy-17α - [3' - furyl - 1,3,5,6,8(9)-estrapentaene-3-sodium sulfate.

No references cited.

LEWIS GOTTS, *Primary Examiner.*

THOMAS A. MESHBESHER, *Assistant Examiner.*